United States Patent
Misawa et al.

(10) Patent No.: US 9,324,514 B2
(45) Date of Patent: Apr. 26, 2016

(54) KEY INPUT DEVICE

(71) Applicant: Sony Corporation, Tokyo (JP)

(72) Inventors: Junichiro Misawa, Nagano (JP); Masahiro Kobori, Tokyo (JP); Shuichi Chihara, Nagano (JP); Hitoshi Kubota, Nagano (JP); Akihito Kinoshita, Nagano (JP); Yasushi Tsuji, Nagano (JP)

(73) Assignee: Sony Corporation (JP)

( * ) Notice: Subject to any disclaimer, the term of this patent is extended or adjusted under 35 U.S.C. 154(b) by 138 days.

(21) Appl. No.: 14/136,337

(22) Filed: Dec. 20, 2013

(65) Prior Publication Data

US 2014/0183019 A1 Jul. 3, 2014

(30) Foreign Application Priority Data

Dec. 27, 2012 (JP) ................. 2012-285644

(51) Int. Cl.
*H01H 13/70* (2006.01)
*H01H 13/86* (2006.01)
*G06F 1/16* (2006.01)

(52) U.S. Cl.
CPC .............. *H01H 13/70* (2013.01); *G06F 1/166* (2013.01); *G06F 1/1616* (2013.01); *G06F 1/1626* (2013.01); *G06F 1/1643* (2013.01); *G06F 1/1666* (2013.01); *H01H 13/86* (2013.01); *H01H 2221/032* (2013.01); *H01H 2223/052* (2013.01)

(58) Field of Classification Search
CPC ............ H01H 13/86; H01H 2223/052; H01H 2223/05; H01H 2223/048; H01H 2221/032; H01H 2221/052; G06F 1/1616; G06F 1/1666
USPC ............... 200/341, 43.16, 43.18; 361/679.13; 400/492
See application file for complete search history.

(56) References Cited

U.S. PATENT DOCUMENTS

| | | | | |
|---|---|---|---|---|
| 5,635,928 | A * | 6/1997 | Takagi et al. | 361/679.13 |
| 6,314,274 | B1 * | 11/2001 | Kumagai | 455/90.3 |
| 6,559,399 | B2 * | 5/2003 | Hsu et al. | 200/344 |
| 2013/0235512 | A1 * | 9/2013 | Chiang et al. | 361/679.01 |
| 2014/0311880 | A1 * | 10/2014 | Krumpelman et al. | 200/5 A |

FOREIGN PATENT DOCUMENTS

JP 11-134091 5/1999

* cited by examiner

*Primary Examiner* — Felix O Figueroa
(74) *Attorney, Agent, or Firm* — Lerner, David, Littenberg, Krumholz & Mentlik, LLP

(57) ABSTRACT

There is provided a key input device including a supporting member including groove portions inclined with respect to a horizontal direction, a plurality of keytops each including a sliding portion which is fitted in a corresponding groove portion of the groove portions and slides along the groove portion, and a control member configured to cause two or more keytops of the plurality of keytops to slide obliquely downward along the groove portions.

10 Claims, 13 Drawing Sheets

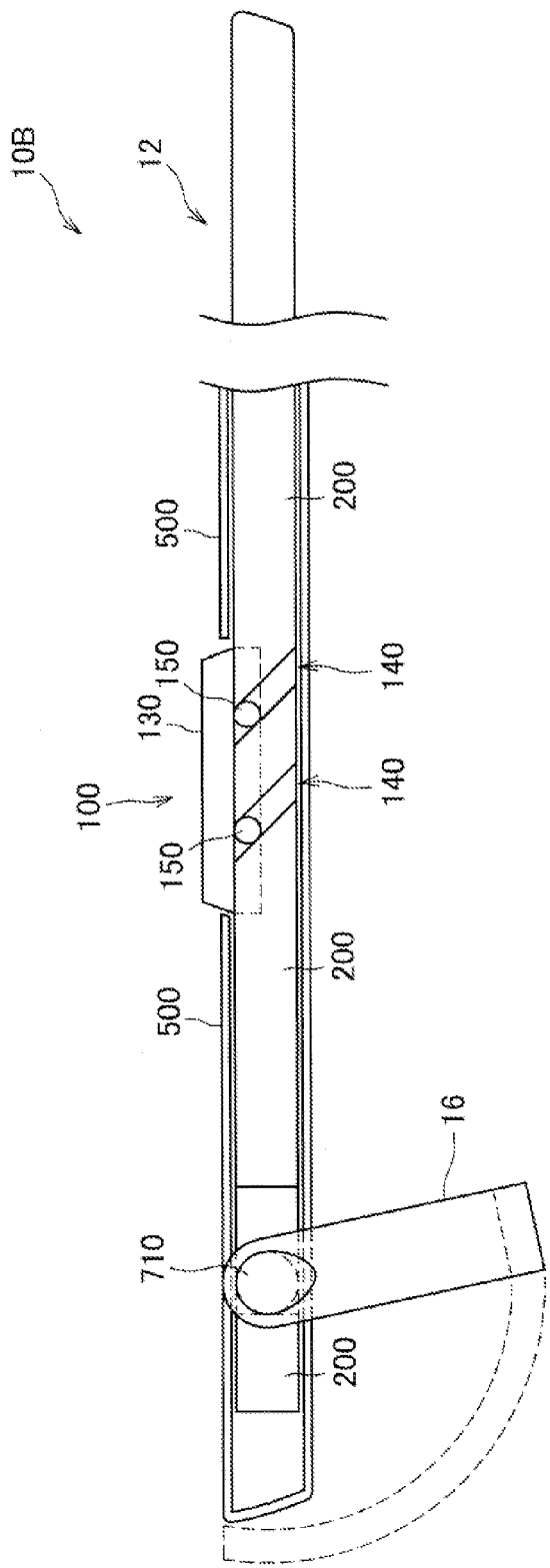

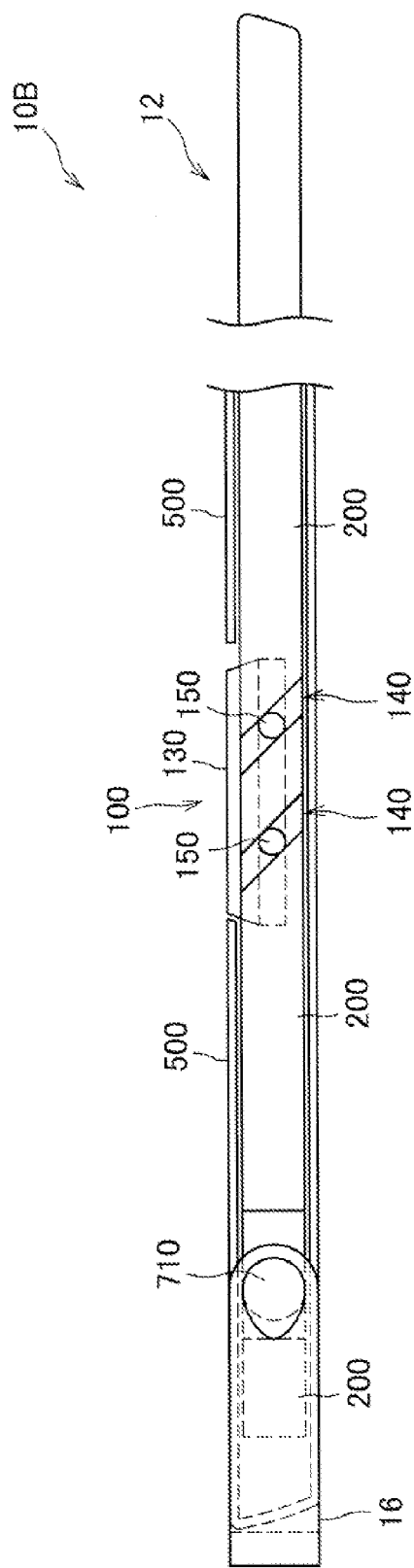

KEY INPUT DEVICE

CROSS REFERENCE TO RELATED APPLICATIONS

This application claims the benefit of Japanese Priority Patent Application JP 2012-285644 filed Dec. 27, 2012, the entire contents of which are incorporated herein by reference.

BACKGROUND

The present disclosure relates to a key input device.

In recent years, there is a very remarkable trend of making thinner PCs (Personal Computers) and mobile information equipment, and it has become more important than before to develop thinner PCs and mobile information equipment. In particular, it is important to make thinner clam-shell PCs and mobile information equipment. Meanwhile, to make thinner a body of a PC or mobile information equipment, reduction of the height of a key input device is conceivable. However, excessive reduction of the thickness of a keyboard makes it difficult to ensure a stroke in key input, and thus it can be said that there is a tradeoff between ensuring key touch and reducing the height of the key input device.

To enable both ensuring key touch and reducing the height of the key input device, there is a technique of interlocking keytops with opening and closing of a liquid crystal display, for example. When the liquid crystal display is closed, the keytops are lowered to a full-stroke position. Examples of such a technique include: a technique of closing the liquid crystal display while a columnar support of a pantograph is horizontally moved in conjunction with the liquid crystal display; and a technique of lowering keytops by moving a sheet with holes in parallel with the keytops and by putting a spring structure portion incorporated into a pantograph into the corresponding hole in the sheet (see JP H11-134091A, for example).

There is also a technology of utilizing an adhesion force or a suction force due to a magnet force between magnets for obtaining force of holding the position of the keytops, instead of using rubber domes and pantograph mechanisms, or tactile switches. Further, combining a technology of obliquely sliding the keytops makes it possible to ensure key touch while ensuring strokes. This technology can contribute to thickness reduction of a key input device.

SUMMARY

However, the technology using the pantograph structure makes the structure of the key input device complicated, and it is not easy to implement the technology from sturdiness and cost viewpoints. In addition, in the technology using an adhesion force or a suction force caused by a magnetic force between magnets, a height for a stroke in key input is provided. It can be said that there is room for improvement in further thickness reduction.

Accordingly, it is desirable to provide a technology which can make the key input device thinner easily from the sturdiness and cost viewpoints.

According to an embodiment of the present disclosure, there is provided a key input device including a supporting member including groove portions inclined with respect to a horizontal direction, a plurality of keytops each including a sliding portion which is fitted in a corresponding groove portion of the groove portions and slides along the groove portion, and a control member configured to cause two or more keytops of the plurality of keytops to slide obliquely downward along the groove portions.

According to the embodiments of the present disclosure described above, it is possible to make the key input device thinner easily from the sturdiness and cost viewpoints.

BRIEF DESCRIPTION OF THE DRAWINGS

FIG. 11B is an example of a side diagram of the information processing apparatus that is in use;

FIG. 12B is an example of a side diagram of the information processing apparatus that is not in use.

DETAILED DESCRIPTION OF THE EMBODIMENTS

Figure 1:
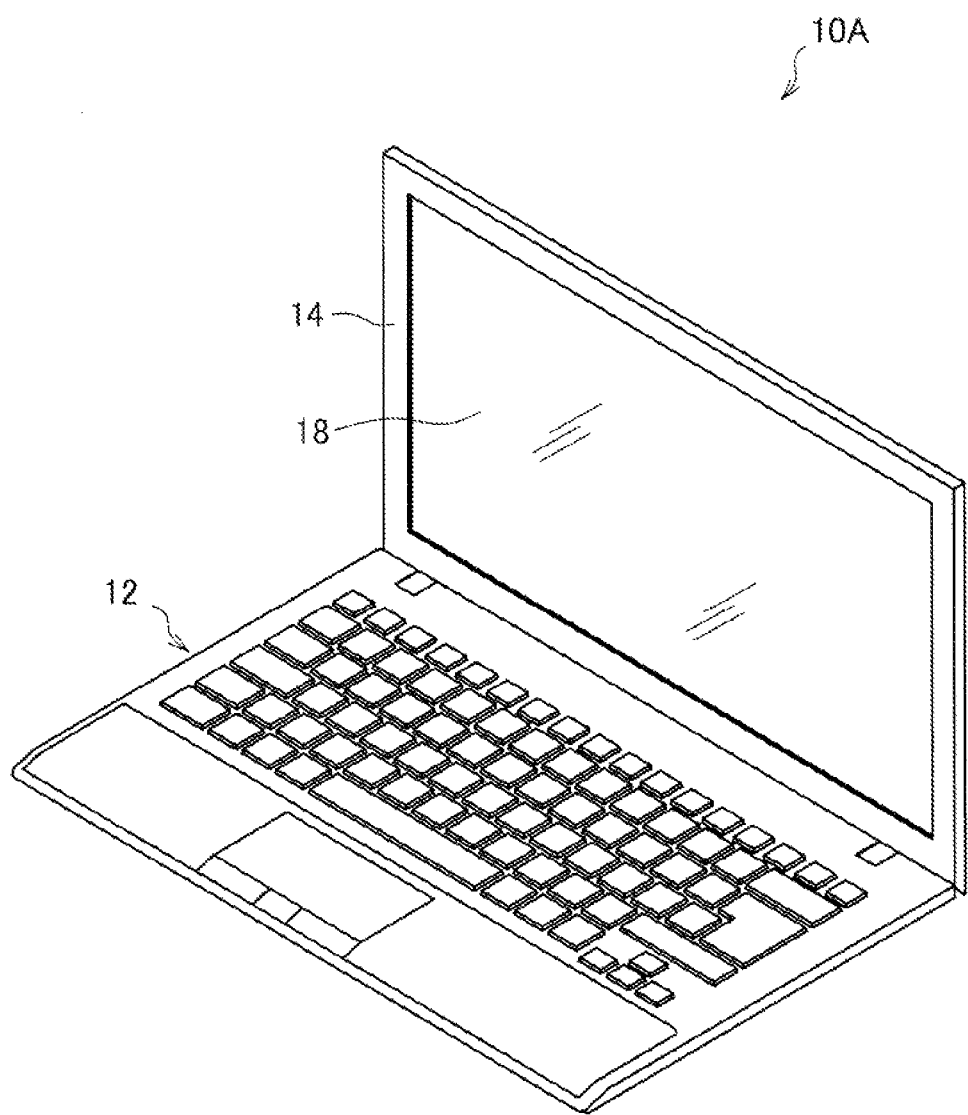
FIG. 1 is a diagram illustrating an appearance example of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this specification and the appended drawings, a plurality of structural elements that have substantially the same function and structure might be denoted with the same reference numerals suffixed with different letters to be discriminated from one another. However, when not having to be particularly discriminated from one another, the plurality of structural elements that have substantially the same function and structure are denoted with the same reference numerals only.

In addition, headings in the following order are used for DETAILED DESCRIPTION OF THE EMBODIMENTS.

1. First Embodiment
 1-1. Appearance Example of Information Processing Apparatus
 1-2. Appearance Example of Key Input Device
 1-3. Supporting Member Structure
 1-4. Keytop Structure
 1-5. Positional Relationship between Bezel and Keytop
 1-6. Groove Portion Structure
 1-7. Keyboard Module Position Before Sliding Start
 1-8. Keyboard Module Position at End of Sliding
 1-9. Keyboard Module Position in Intermediate State
 1-10. Keyboard Module Position in Information Processing Apparatus Not in Use
 1-11. Function of Control Member
2. Second Embodiment
 2-1. Appearance Example of Information Processing Apparatus in Use
 2-2. Keyboard Module Position in Information Processing Apparatus in Use
 2-3. Appearance Example of Information Processing Apparatus Not in Use
 2-4. Keyboard Module Position in Information Processing Apparatus Not in Use
3. Third Embodiment
 3-1. Appearance Example of Information Processing Apparatus in Use
 3-2. Information Processing Apparatus in Intermediate State
 3-3. Information Processing Apparatus Not in Use
4. Conclusion <<1. First Embodiment>>

Hereinafter, a description is given of a first embodiment of the present disclosure.

[1-1. Appearance Example of Information Processing Apparatus]

Firstly, a description is given of an appearance example of an information processing apparatus 10A according to the first embodiment of the present disclosure. FIG. 1 is a diagram illustrating an appearance example of the information processing apparatus 10A according to the first embodiment of the present disclosure. As illustrated in FIG. 1, the information processing apparatus 10A includes a key input device 12 and a lid body 14. Here, FIG. 1 illustrates as an example the information processing apparatus 10A which is a laptop PC (Personal Computer), but the information processing apparatus 10A may be another type PC (such as a desktop PC) including the key input device 12 and the lid body 14.

In addition, the present embodiment shows an example in which the information processing apparatus 10A includes the lid body 14, but the lid body 14 does not have to be particularly provided. Moreover, the example in FIG. 1 shows that the lid body 14 is provided with a display device 18, but the lid body 14 does not have to be provided with the display device 18. Further, the present embodiment describes as an example the key input device 12 incorporated into the information processing apparatus 10A, but the key input device does not have to be incorporated into the information processing apparatus 10A.

The appearance example of the information processing apparatus 10A according to the first embodiment of the present disclosure has heretofore been described.

[1-2. Appearance Example of Key Input Device]

Figure 2:
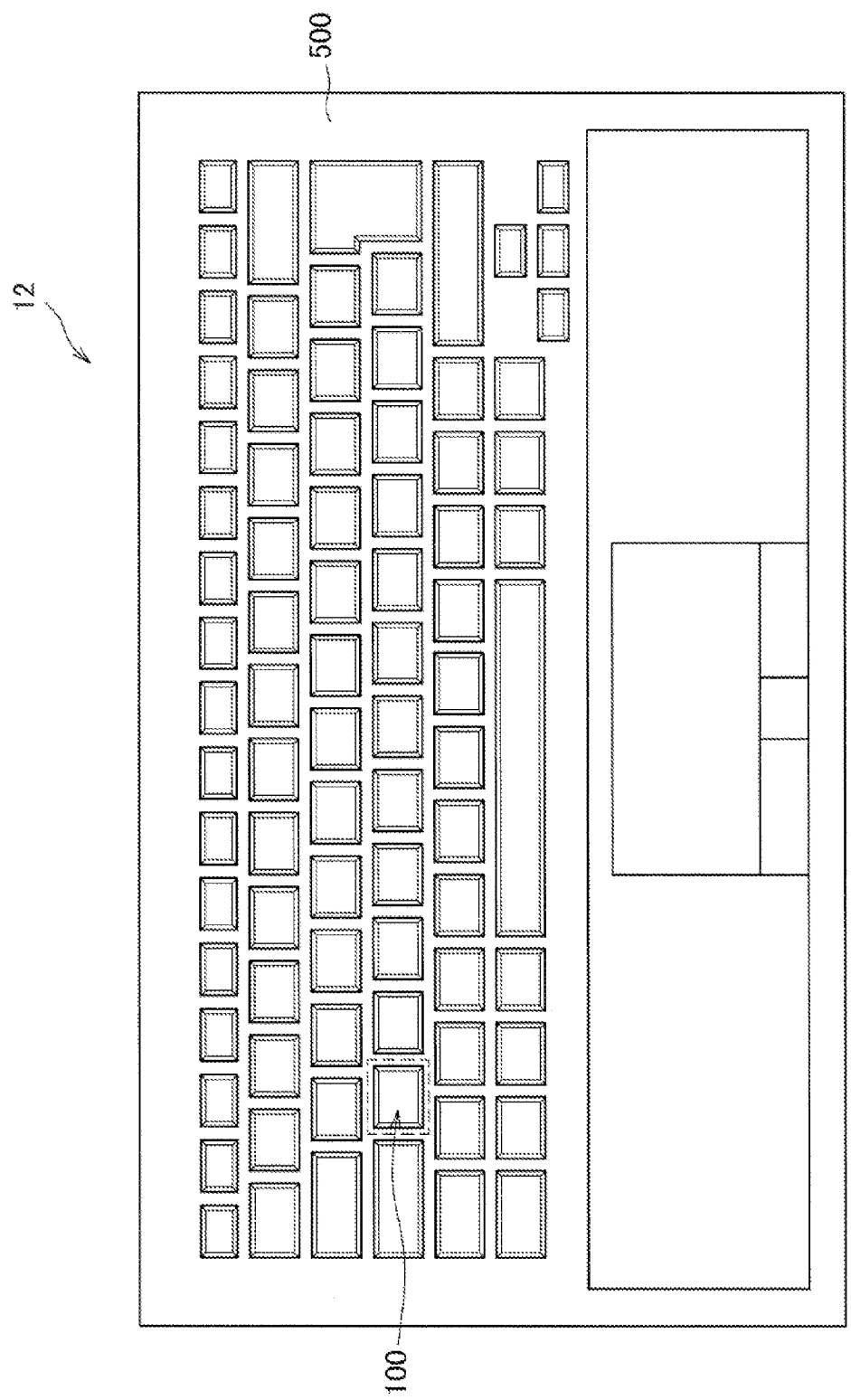
FIG. 2 is a diagram illustrating an appearance example of a key input device according to the first embodiment of the present disclosure.

Subsequently, a description is given of an appearance example of the key input device 12 according to the first embodiment of the present disclosure. FIG. 2 is a diagram illustrating an appearance example of the key input device 12 according to the first embodiment of the present disclosure. The key input device 12 includes a plurality of keyboard modules. FIG. 2 illustrates keyboard modules 100 as an example of the plurality of keyboard modules. Note that a function of the keyboard modules 100 in FIG. 2 is hereinafter described, but the keyboard modules 100 merely exemplify the plurality of keyboard modules in the description. Thus, other keyboard modules may function in the same manner.

The appearance example of the key input device 12 according to the first embodiment of the present disclosure has heretofore been described.

[1-3. Supporting Member Structure]

Figure 3:
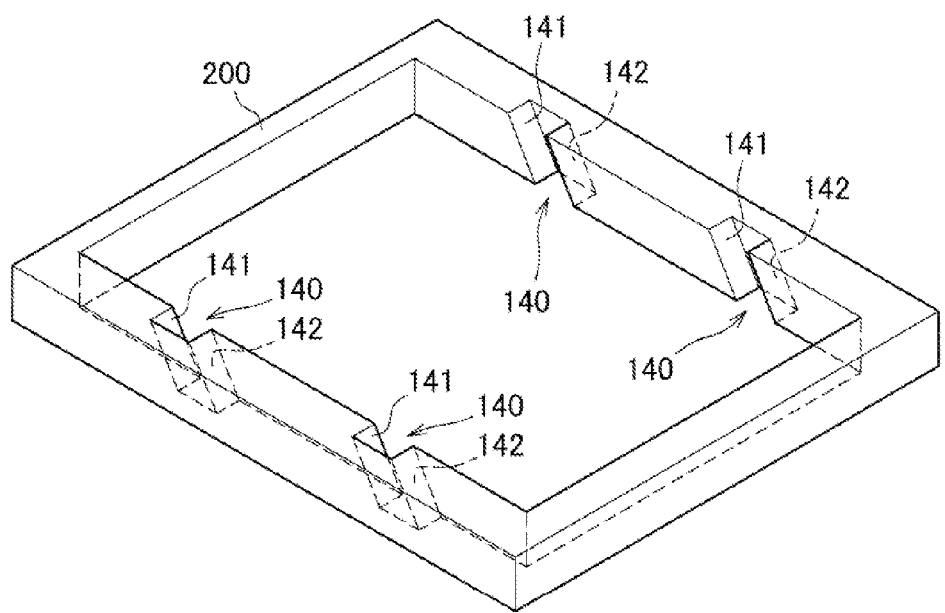
FIG. 3 is an example of a perspective diagram of a supporting member according to the first embodiment of the present disclosure.
Figure 4:
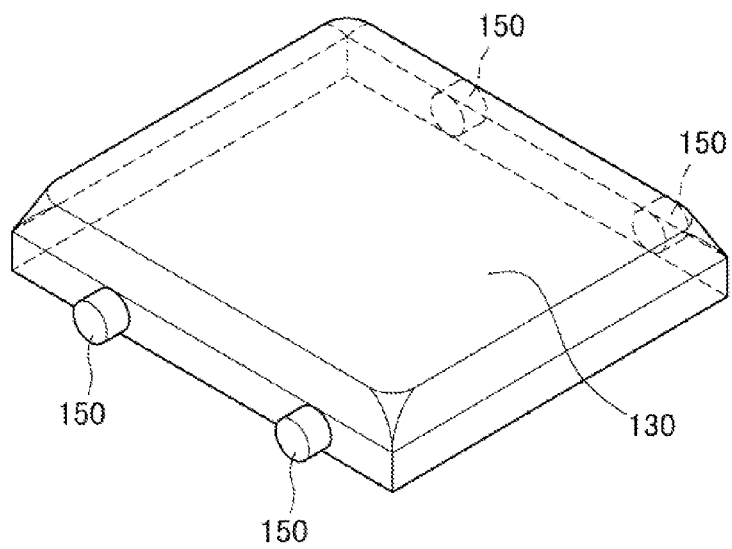
FIG. 4 is an example of a perspective diagram of a keytop according to the first embodiment of the present disclosure.

Subsequently, a description is given of a structure of each keyboard module 100 according to the first embodiment of the present disclosure. The keyboard modules 100 include keytops 130 and a supporting member 200. FIG. 3 is an example of a perspective diagram of the supporting member 200 according to the first embodiment of the present disclosure, and FIG. 4 is an example of a perspective diagram of one of the keytops 130 according to the first embodiment of the present disclosure. Firstly, a structure of the supporting member 200 will be described with reference to FIG. 3.

As illustrated in FIG. 3, the supporting member 200 includes groove portions 140 which are each inclined with respect to a horizontal direction. Although the groove portions 140 are provided in the supporting member 200 at four positions in the example in FIG. 3, the number of the groove portions 140 provided in the supporting member 200 is not particularly limited. However, when the groove portions 140 are provided at four or more positions, the keytop 130 is expected to move up and down with a surface of the keytop 130 kept horizontally.

In addition, an inclination angle of each groove portion 140 and a position of the groove portion 140 in the supporting member 200 are not particularly limited, either. The groove portion 140 includes a first guide surface 141 and a second guide surface 142. The first guide surface 141 and the second guide surface 142 may each be a flat surface or a curved surface as to be described later.

The structure of the supporting member 200 according to the first embodiment of the present disclosure has heretofore been described.

[1-4. Keytop Structure]

Subsequently, a structure of the keytop 130 will be described with reference to FIG. 4. As illustrated in FIG. 4, the keytop 130 includes sliding portions 150. Each sliding portion 150 is fitted in the corresponding groove portion 140 and slides obliquely upward and downward along the groove portion 140. For example, when sliding obliquely downward along the groove portion 140, the sliding portion 150 slides on the first guide surface 141. In contrast, for example, when sliding obliquely upward along the groove portion 140, the sliding portion 150 slides on the second guide surface 142. The sliding direction of the sliding portion 150 is restricted to predetermined directions in this manner.

Although the sliding portions 150 are provided in the keytop 130 at four positions in the example in FIG. 4, the number of the sliding portions 150 provided in the keytop 130 is not particularly limited. For example, it is only necessary to provide as many sliding portions 150 as the groove portions 140. In addition, the positions of the sliding portions 150 in the keytop 130 are not particularly limited, and only have to correspond to the positions of the groove portions 140, for example.

The structure of the keytop 130 according to the first embodiment of the present disclosure has heretofore been described.

[1-5. Positional Relationship between Bezel and Keytop]

Figure 5:
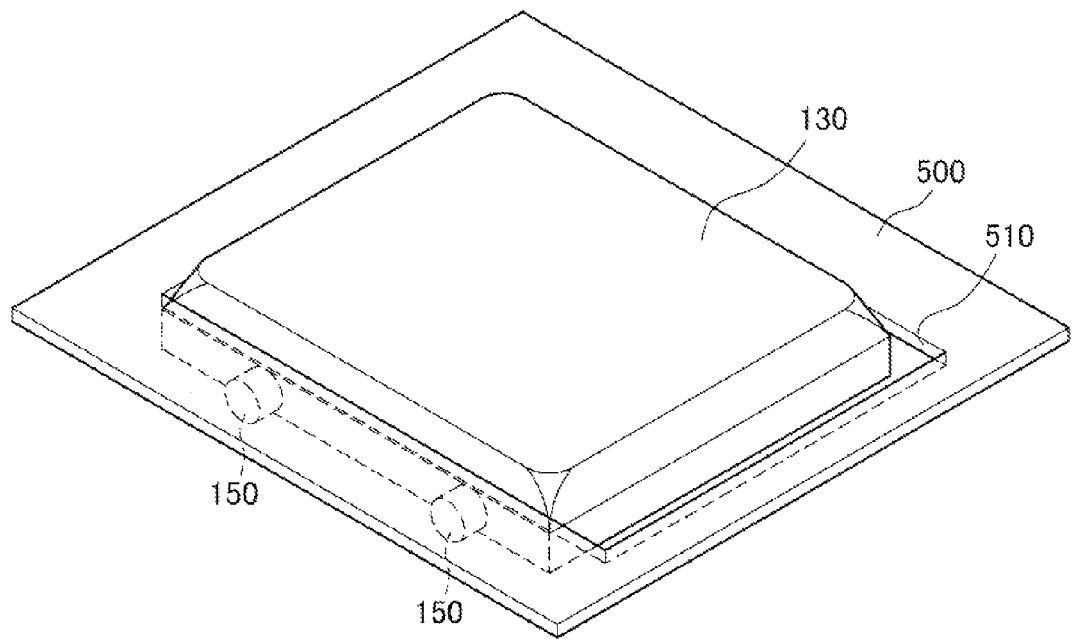
FIG. 5 is a diagram illustrating an example of a positional relationship between a bezel and the keytop according to the first embodiment of the present disclosure.

Subsequently, a description is given of a positional relationship between a bezel 500 and the keytop 130 on the key input device 12 according to the first embodiment of the present disclosure. FIG. 5 is a diagram illustrating an example of the positional relationship between the bezel 500 and the keytop 130 according to the first embodiment of the present disclosure.

As illustrated in FIG. 5, the bezel 500 is provided with hole portions 510 each having a shape corresponding to the keytop 130. For this reason, the keytop 130 can move obliquely upward and downward in such a manner as to pass through the corresponding hole portion 510. In addition, when the keytop 130 moves obliquely upward, the bezel 500 can function as a stopper for the sliding portions 150. Thus, the bezel 500 can prevent the keytop 130 from coming off upward.

The positional relationship between the bezel 500 and the keytop 130 on the key input device 12 according to the first embodiment of the present disclosure has heretofore been described.

[1-6. Groove Portion Structure]

Figure 6:
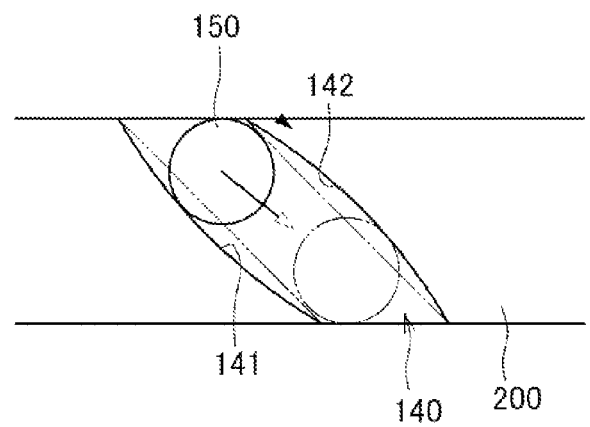
FIG. 6 is an example of a side diagram of a groove portion according to the first embodiment of the present disclosure.

Subsequently, a description is given of a structure of each groove portion 140 according to the first embodiment of the present disclosure. FIG. 6 is an example of a side diagram of the groove portion 140 according to the first embodiment of the present disclosure. As described above, the first guide surface 141 and the second guide surface 142 may each be a flat surface or a curved surface. However, for example, it suffices that the first guide surface 141 and the second guide surface 142 each have a surface curved outward as illustrated in FIG. 6.

As to be described later, it is assumed that when the supporting member 200 or the bezel 500 moves rightward or leftward, each sliding portion 150 slides due to a pressure received from the supporting member 200 or the bezel 500. This leads to expectation of an advantageous effect in which a pressure direction closer to a sliding direction of the sliding portion 150 at the start of sliding leads to smoother start of the sliding of the sliding portion 150 due to the pressure received from the supporting member 200 or the bezel 500.

The structure of the groove portion 140 according to the first embodiment of the present disclosure has heretofore been described.

[1-7. Keyboard Module Position Before Sliding Start]

Figure 7:
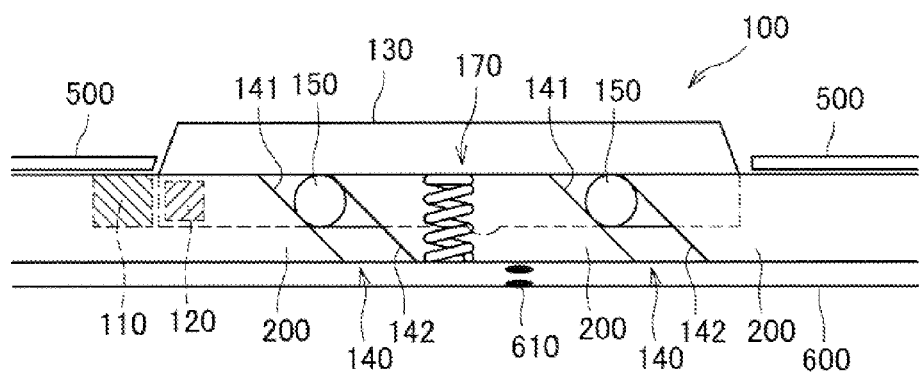
FIG. 7 is an example of a side diagram of a keyboard module before the start of sliding.

Subsequently, a description is given of the position of the keyboard modules 100 before the start of sliding. FIG. 7 is an example of a side diagram of one of the keyboard modules 100 before the start of sliding. As illustrated in FIG. 7, the keytop 130 is held at a predetermined position by at least one predetermined fixing member before the sliding start. The predetermined fixing member may be: a magnet 110 and a magnet 120; an elastic body 170; or the magnet 110, the magnet 120, and the elastic body 170 as illustrated in FIG. 7.

When the magnets 110 and 120 are used as the predetermined fixing members, the magnet 110 and the magnet 120 are provided, for example, in the supporting member 200 and in the keytop 130, respectively. This structure enables the position of the keytop 130 to be maintained by using an adhesion force or a suction force caused by a magnetic force generated between the magnet 110 and the magnet 120. When the elastic body 170 is used as the predetermined fixing member, the elastic body 170 is provided under the keytop 130, for example. This structure enables the position of the keytop 130 to be maintained by using a restoring force of the elastic body 170. The elastic body 170 may be a silicon rubber in a dome shape or have a spring shape as illustrated in FIG. 7.

When the user applies a pressing force to the keytop 130, each sliding portion 150 slides obliquely downward on the first guide surface 141, so that the keytop 130 moves obliquely downward. As the result, for example, key input is detected due to proximity or contact of the keytop 130 to or with a detector 610. The detector 610 may be a membrane switch provided in a membrane sheet 600 as illustrated in FIG. 7 or a sensor such as a capacitive sensor.

When the user releases the pressing force applied to the keytop 130, the predetermined fixing member causes the sliding portion 150 to slide obliquely upward, so that the keytop 130 moves obliquely upward. As the result, for example, the proximity or contact of the keytop 130 to or with the detector 610 is cancelled, and thus cancellation of the key input is detected. When the keytop 130 moves obliquely upward, the state of the keytop 130 restores to the state before the start of sliding as illustrated in FIG. 7, and the keytop 130 is held at the predetermined position by the predetermined fixing member.

The position of the keyboard modules 100 before the start of sliding has heretofore been described.

[1-8. Keyboard Module Position at End of Sliding]

Figure 8:
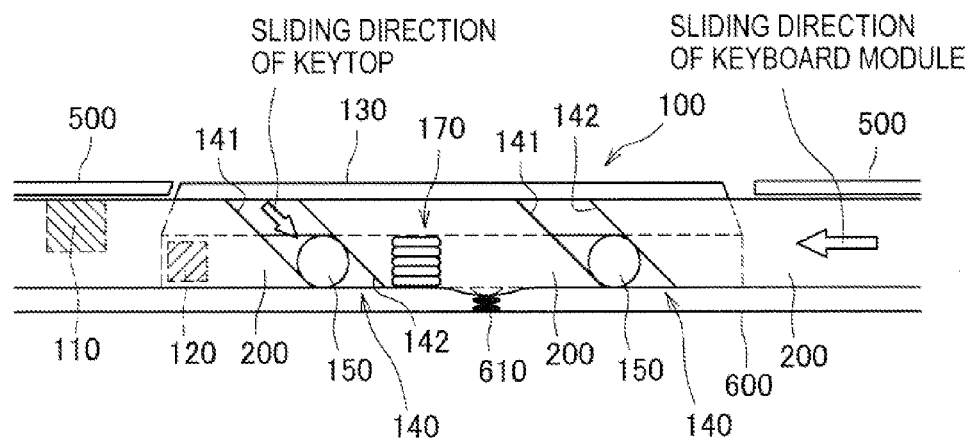
FIG. 8 is an example of a side diagram of the keyboard module at the end of sliding.

Subsequently, a description is given of the position of the keyboard modules 100 at the end of sliding. FIG. 8 is an example of a side diagram of one of the keyboard modules 100 at the end of sliding. As illustrated in FIG. 8, a predetermined control member causes the sliding portions 150 provided in each of at least two keytops 130 among the plurality of keytops 130 to slide obliquely downward along the groove portions 140. The example of the predetermined control member will be described in detail later.

Such a structure makes it possible to reduce the height of the keytops 130 by sliding the sliding portions 150 obliquely downward along the groove portions 140 in a simple structure. Thus, the key input device 12 can be made thinner easily from the sturdiness and cost viewpoints. In addition, when the key input device 12 is in use, the keytops 130 are held at the upper position, and thus it is possible to ensure the feeling of the key touch.

For example, the predetermined control member may apply a pressing force to the keytops 130 to thereby cause the sliding portions 150 to slide obliquely downward along the groove portions 140. The pressing force may be applied to the keytops 130 directly from the predetermined control member or indirectly via another member. FIG. 8 illustrates an example in which the predetermined control member applies a horizontal pressing force to the supporting member 200 to thus apply a pressing force to the keytops 130 via the supporting member 200, and thereby causes the sliding portions 150 to slide obliquely downward along the groove portions 140.

In more detail, suppose a case where the supporting member 200 is horizontally movable. In this case, when the predetermined control member applies a horizontal pressing force (in a left direction in FIG. 8) to the supporting member 200, each sliding portion 150 receives the pressing force from the corresponding second guide surface 142, so that the sliding portion 150 slides obliquely downward on the second guide surface 142. On the other hand, when the horizontal pressing force applied to the supporting member 200 is released, an upward restoring force from the predetermined fixing member causes the sliding portion 150 to generate a force pressing the second guide surface 142. As the result, the keytops 130 slide obliquely upward, while generating a force pressing the supporting member 200 in an opposite direction (a right direction in FIG. 8).

When the predetermined control member applies the horizontal pressing force to the supporting member 200, the following advantageous effect is also expected. Specifically, in the case where the pressing force is applied to the supporting member 200 in comparison with a case where the pressing force is applied to the bezel 500 on a surface of the information processing apparatus 10A, advantageous effects are expected in which it is possible to prevent rigidity of an enclosure from being impaired and the surface of the information processing apparatus 10A from being cracked.

The following is another conceivable case where the predetermined control member indirectly applies a pressing force to the keytops 130. For example, by applying a horizontal pressing force to the bezel 500 and applying a pressing force to the keytops 130 via the bezel 500, the predetermined control member may cause each sliding portion 150 to slide obliquely downward along the groove portion 140.

In more detail, suppose a case where the bezel 500 is horizontally movable. In this case, when the predetermined control member applies a horizontal pressing force (in the right direction in FIG. 8) to the bezel 500, the keytops 130 receive the pressing force from the bezel 500, so that each sliding portion 150 slides obliquely downward on the second guide surface 142. On the other hand, when the horizontal pressing force applied to the bezel 500 is released, the keytops 130 receive an upward pressing force due to the predetermined fixing member. The sliding portion 150 generates a force pressing the second guide surface 142. As the result, the keytops 130 slide obliquely upward while generating a force pressing the bezel 500 in an opposite direction (the left direction in FIG. 8).

The position of the keyboard module 100 at the end of sliding has heretofore been described.

[1-9. Keyboard Module Position in Intermediate State]

Figure 9A:
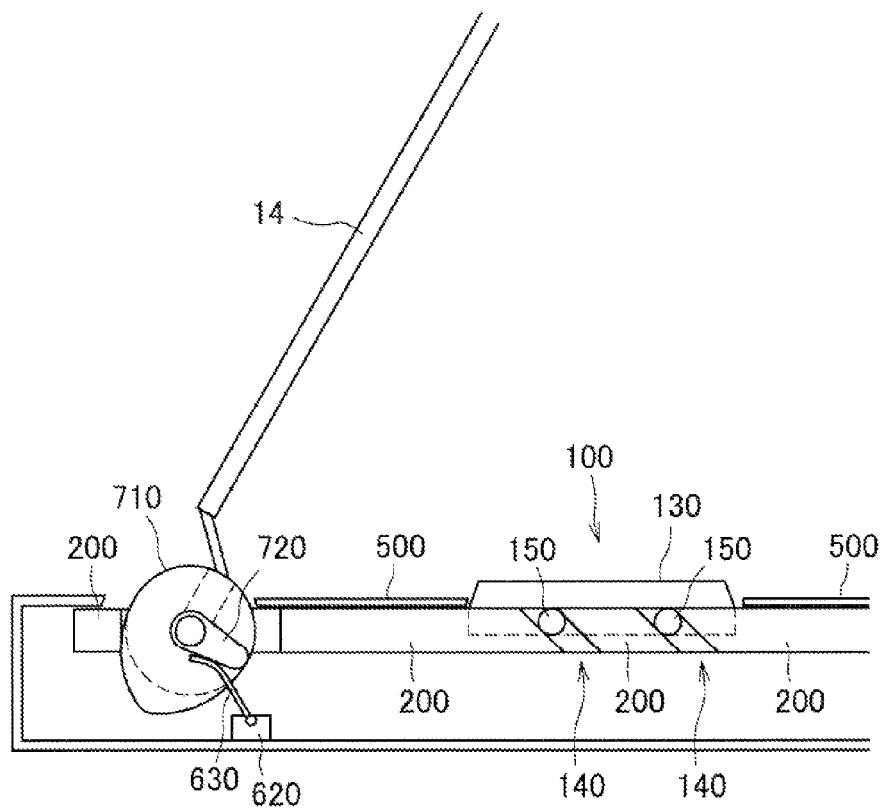
FIG. 9A is an example of a side diagram of the keyboard module in an intermediate state.

Subsequently, a description is given of the position of the keyboard modules 100 in an intermediate state. FIG. 9A is an example of a side diagram of one of the keyboard modules in the intermediate state. Here, the intermediate state corresponds to, for example, a state in the process of closing the lid body 14 by the user in the case where the user finishes the use of the information processing apparatus 10A.

Any member may be used as the predetermined control member as described above. For example, as illustrated in FIG. 9A, the predetermined control member may include a second cam 720. In this case, the second cam 720 may rotate in conjunction with the opening and closing of the lid body 14 and press down a detection switch 620 when an angle between the lid body 14 and the bezel 500 becomes smaller than a second angle, the detection switch 620 being for cancelling key input by using a pressure applied in a rotating direction from the outside for closing the lid body 14.

In the example in FIG. 9A, when the angle between the lid body 14 and the bezel 500 becomes smaller than the second angle, the second cam 720 rotates the rotating member 630 by using the pressure applied in the rotating direction from the outside for closing the lid body 14. The rotation of the rotating member 630 is detected by the detection switch 620 as a signal for key input cancellation. After the signal for key input cancellation is detected, a pressing force applied to any keytop 130 is not regarded as key input even though the pressing force is detected. This can prevent erroneous key input in opening and closing the lid body 14. Note that a method for detecting the second angle is not limited to the method using the cam and the switch. For example, the second angle may be detected by optically detecting a cross section or the like of a first cam 710 or the supporting member 200 by using a proximity sensor, or may be magnetically detected by using Hall devices in a state where a magnetic body is buried in the first cam 710.

Note that, for example, as long as the detection switch 620 is pressed down, the detection switch 620 continues outputting the signal for causing an OS (Operating System) for operating the information processing apparatus 10A to cancel key input. As long as the OS receives the signal from the detection switch 620, the OS cancels the key input.

The position of the keyboard modules 100 in the intermediate state has heretofore been described.

[1-10. Keyboard Module Position in Information Processing Apparatus Not in Use]

Figure 9B:
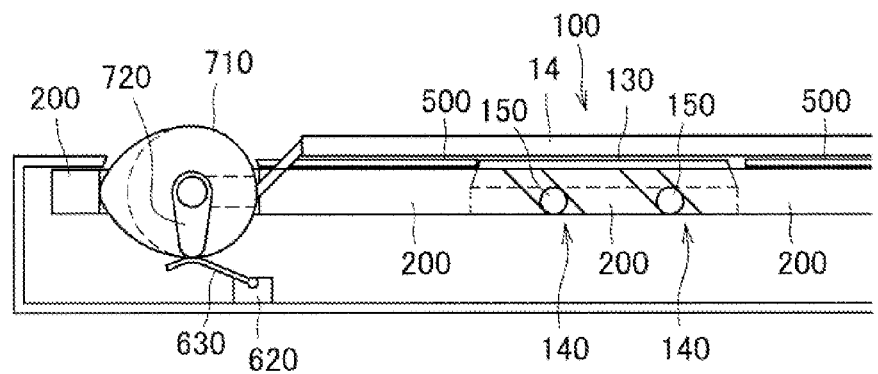
FIG. 9B is an example of a side diagram of the keyboard module at the time of not using the information processing apparatus.

Subsequently, a description is given of the position of the keyboard modules 100 at the time of not using the information processing apparatus 10A. FIG. 9B is an example of a side diagram of one of the keyboard modules 100 at the time of not using the information processing apparatus 10A. Here, for example, when the user finishes the use of the information processing apparatus 10A and completes closing the lid body 14, the information processing apparatus 10A is regarded as being not in use.

As described above, the predetermined control member causes the sliding portions 150 to slide obliquely downward along the groove portions 140. However, for example, the predetermined control member may use a pressure applied from the outside to cause the sliding portions 150 to slide obliquely downward along the groove portions 140. The type of the pressure applied from the outside is not particularly limited. For example, the predetermined control member may use a pressure applied from the outside for closing the lid body 14 to cause the sliding portions 150 to slide obliquely downward along the groove portions 140.

As described above, any member may be used as the predetermined control member. For example, as illustrated in FIG. 9B, the predetermined control member may include the first cam 710. In this case, the first cam 710 may rotate in conjunction with the opening and closing of the lid body 14 and apply a pressing force to the keytops 130 when the angle between the lid body 14 and the bezel 500 becomes smaller than a first angle, the pressing force being applied by using the pressure applied in the rotating direction from the outside for closing the lid body 14.

In particular, in the example in FIG. 9B, when the angle between the lid body 14 and the bezel 500 becomes smaller than the first angle, the first cam 710 applies a horizontal pressing force (in the left direction in FIG. 9B) to the supporting member 200, by using the pressure applied in the rotating direction from the outside for closing the lid body 14. As the result, the sliding portions 150 slide obliquely downward along the groove portions 140. On the other hand, when the angle between the lid body 14 and the bezel 500 becomes larger than the first angle and thus the pressing force applied to the supporting member 200 is cancelled, the sliding portions 150 slide obliquely upward along the groove portions 140.

Note that a relationship between the angle between the lid body 14 and the bezel 500 and an amount of movement of the supporting member 200 or the bezel 500 can be controlled according to the shape, size, direction, or the like of the first cam 710. Here, a surface of the first cam 710 is symmetrical in the example in FIG. 9B. However, the surface of the first cam 710 does not necessarily have to be symmetrical. For example, a case where the surface of the first cam 710 is distorted might exert an advantageous effect in which the sliding of the sliding portions 150 is started more smoothly than in the case of symmetrical surface, due to the pressing force received from the supporting member 200 or the bezel 500.

As described above, also when the first guide surface 141 and the second guide surface 142 have outwardly curved surfaces, the same advantageous effect is expected. To obtain such an advantageous effect, each of the first guide surface 141 and the second guide surface 142 may be distorted, the surface of the first cam 710 may be distorted, or each of the first guide surface 141, the second guide surface 142, and the surface of the first cam 710 may be distorted.

The position of the keyboard modules 100 at the time of not using the information processing apparatus 10A has heretofore been described.

[1-11. Function of Control Member]

Figure 10:
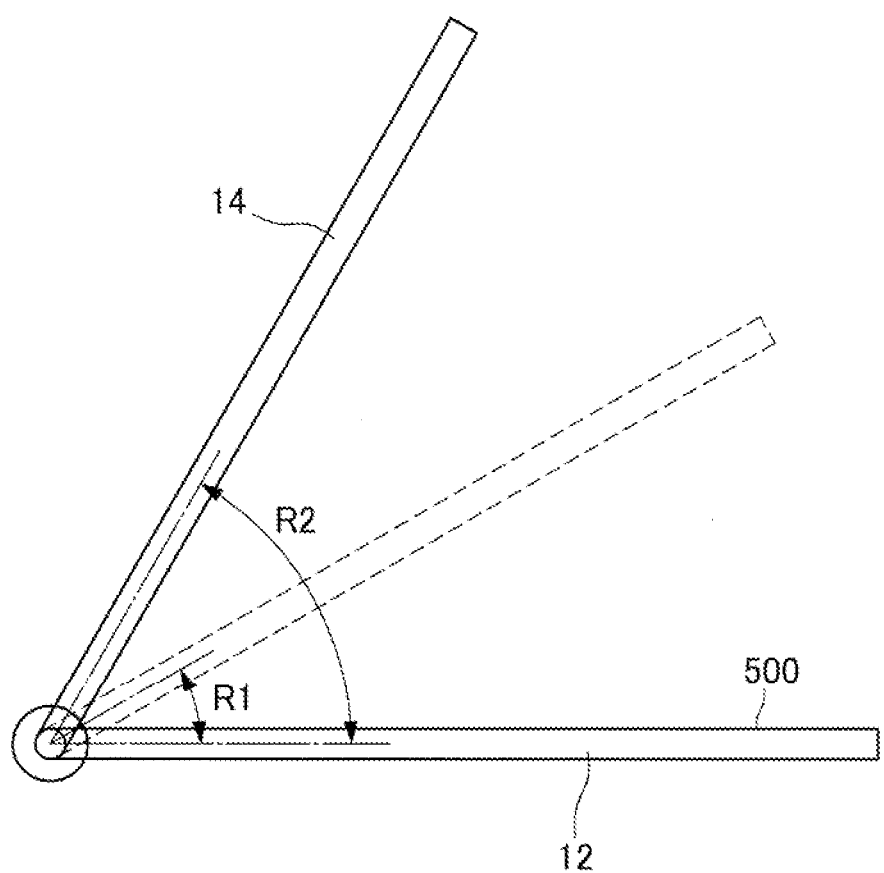
FIG. 10 is a diagram illustrating a function of a predetermined control member implemented depending on an angle between a lid body and a bezel.

Subsequently, a description is given of a function of the control member implemented depending on the angle between the lid body 14 and the bezel 500. FIG. 10 is a diagram illustrating a function of the control member implemented depending on the angle between the lid body 14 and the bezel 500.

As described above, when the angle between the lid body 14 and the bezel 500 becomes smaller than the first angle, the first cam 710 may apply a pressing force to the keytops 130 by using the pressure applied in the rotating direction from the outside for closing the lid body 14. Also as described above, when the angle between the lid body 14 and the bezel 500 becomes smaller than the second angle, the second cam 720 may press down the detection switch 620 for key input cancellation by using the pressure applied in the rotating direction from the outside for closing the lid body 14.

Here, assume a case where the first angle and the second angle are denoted with R1 and R2, respectively. Although a magnitude relationship between the first angle R1 and the second angle R2 is not particularly limited, it suffices that the second angle R2 is set larger than the first angle R1, as illustrated in FIG. 10, for example. In such a magnitude relationship between the first angle R1 and the second angle R2, the range of the angle for key input cancellation is wider than the range of the angle for sliding the keytops 130 for the case of changing the angle between the lid body 14 and the bezel 500. Thus, it is possible to more effectively prevent erroneous key input in opening and closing the lid body 14.

The function of the control member implemented depending on the angle between the lid body 14 and the bezel 500 has heretofore been described.

The first embodiment of the present disclosure has heretofore been described.

<<2. Second Embodiment>>

[2-1. Appearance Example of Information Processing Apparatus in Use]

Subsequently, a description is given of a second embodiment of the present disclosure. Each keyboard module 100 in the second embodiment of the present disclosure has the same configuration as that in the first embodiment of the present disclosure. However, in the first embodiment, the lid body 14 is in an opened state when the information processing apparatus 10A is in use, and is in a closed state when the information processing apparatus 10A is not in use. In the second embodiment in comparison with the first embodiment, a state of an information processing apparatus 10B changes when in use and not in use.

Figure 11A:
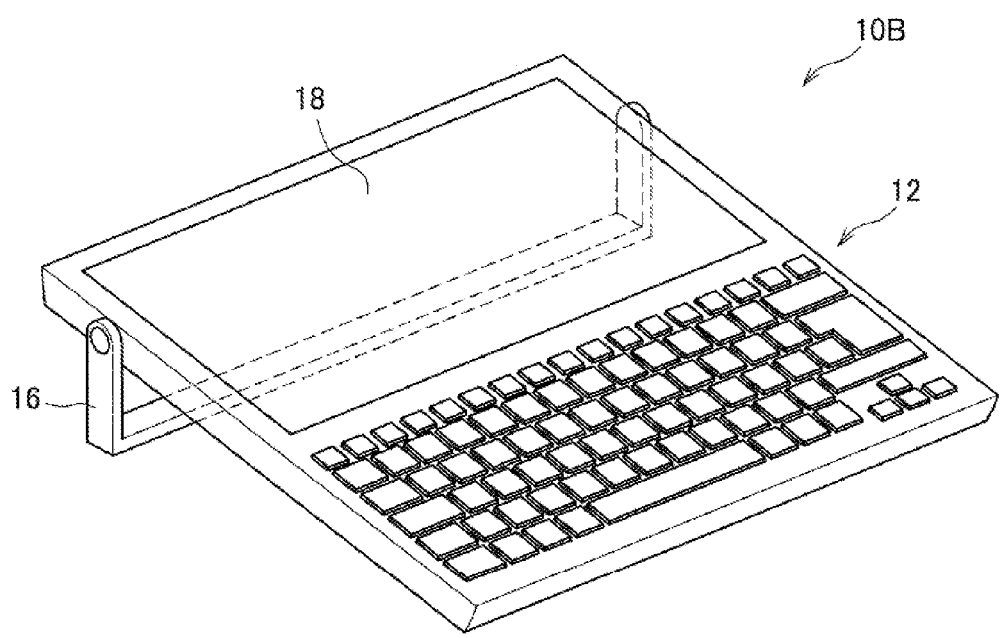
FIG. 11A is a diagram illustrating an appearance example of an information processing apparatus according to a second embodiment of the present disclosure, the information processing apparatus being in use.

Firstly, a description is given of the information processing apparatus 10B according to the second embodiment of the present disclosure, the information processing apparatus 10B being in use. FIG. 11A is a diagram illustrating an appearance example of the in-use information processing apparatus 10B according to the second embodiment of the present disclosure. As illustrated in FIG. 11A, when the information processing apparatus 10B is in use, a rotating member 16 is taken out by the user, and the user performs key input on the key input device 12 supported by the rotating member 16.

The appearance example of the in-use information processing apparatus 10B according to the second embodiment of the present disclosure has heretofore been described.

[2-2. Keyboard Module Position in Information Processing Apparatus in Use]

Subsequently, a description is given of a position of the keyboard modules 100 at the time of using the information processing apparatus 10B according to the second embodiment of the present disclosure. FIG. 11B is an example of a side diagram of the in-use information processing apparatus 10B. For example, as illustrated in FIG. 11B, in a state where an angle between the rotating member 16 and the bezel 500 becomes larger than a first angle and where a pressing force is not applied to the supporting member 200, the keytops 130 are held at the upper position.

The position of the keyboard modules 100 at the time of using the information processing apparatus 10B according to the second embodiment of the present disclosure has heretofore been described.

[2-3. Appearance Example of Information Processing Apparatus Not in Use]

Figure 12A:
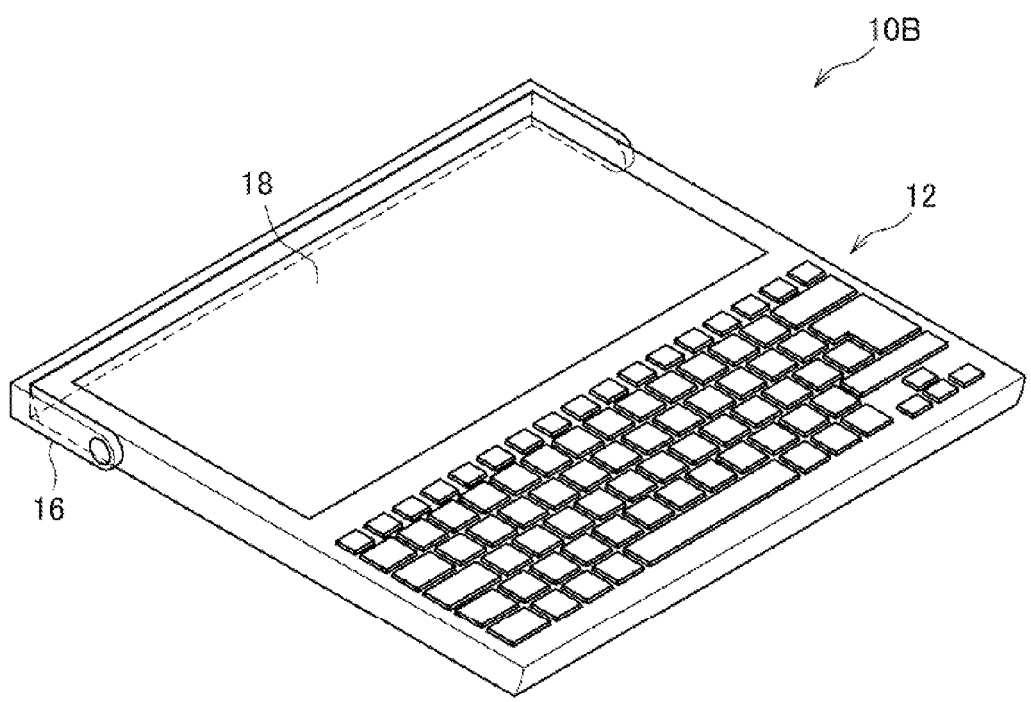
FIG. 12A is a diagram illustrating an appearance example of the information processing apparatus according to the second embodiment of the present disclosure, the information processing apparatus being not in use.

Subsequently, a description is given of an appearance example of the information processing apparatus 10B according to the second embodiment of the present disclosure, the information processing apparatus 10B being not in use. FIG. 12A is a diagram illustrating an appearance example of the not-in-use information processing apparatus 10B according to the second embodiment of the present disclosure. As illustrated in FIG. 12A, when the information processing apparatus 10B is not in use, the rotating member 16 is closed by the user, and thus the user can freely carry the information processing apparatus 10B with the user.

The appearance example of the not-in-use information processing apparatus 10B according to the second embodiment of the present disclosure has heretofore been described.

[2-4. Keyboard Module Position in Information Processing Apparatus Not in Use]

Subsequently, a description is given of the position of the keyboard modules 100 at the time of not using the information processing apparatus 10B according to the second embodiment of the present disclosure. FIG. 12B is an example of a side diagram of the not-in-use information processing apparatus 10B. For example, as illustrated in FIG. 12B, when the angle between the rotating member 16 and the bezel 500 becomes smaller than the first angle, the first cam 710 may apply a pressing force to the keytops 130 by using a pressure applied in a rotating direction from the outside for closing the rotating member 16.

In particular, in the example in FIG. 12B, when the angle between the rotating member 16 and the bezel 500 becomes smaller than the first angle, the first cam 710 applies a horizontal pressing force (in the left direction in FIG. 12B) to the supporting member 200 by using the pressure applied in the rotating direction from the outside for closing the rotating member 16. As the result, the sliding portions 150 slide obliquely downward. On the other hand, when the angle between the rotating member 16 and the bezel 500 becomes larger than the first angle and the pressing force applied to the supporting member 200 is released, the sliding portions 150 slide obliquely upward along the groove portions 140.

The position of the keyboard modules 100 at the time of not using the information processing apparatus 10B according to the second embodiment of the present disclosure has heretofore been described.

The second embodiment of the present disclosure has heretofore been described.

<<3. Third Embodiment>>

[3-1. Appearance Example of Information Processing Apparatus in Use]

Subsequently, a description is given of a third embodiment of the present disclosure. Each keyboard module 100 in the third embodiment of the present disclosure also has the same configuration as that in the first embodiment of the present disclosure. However, in the third embodiment in comparison with the first embodiment, a state of an information processing apparatus 10C changes when in use and not in use.

Figure 13A:
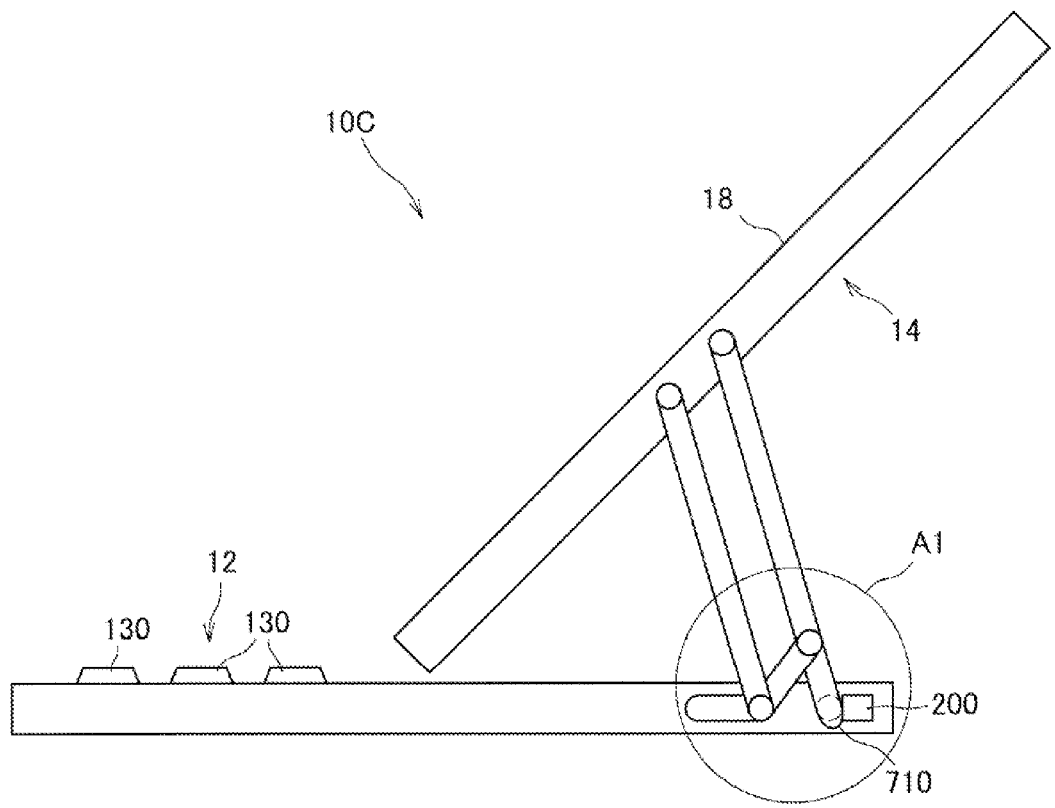
FIG. 13A is an example of a side diagram of an information processing apparatus according to a third embodiment of the present disclosure, the information processing apparatus being in use.
Figure 13B:
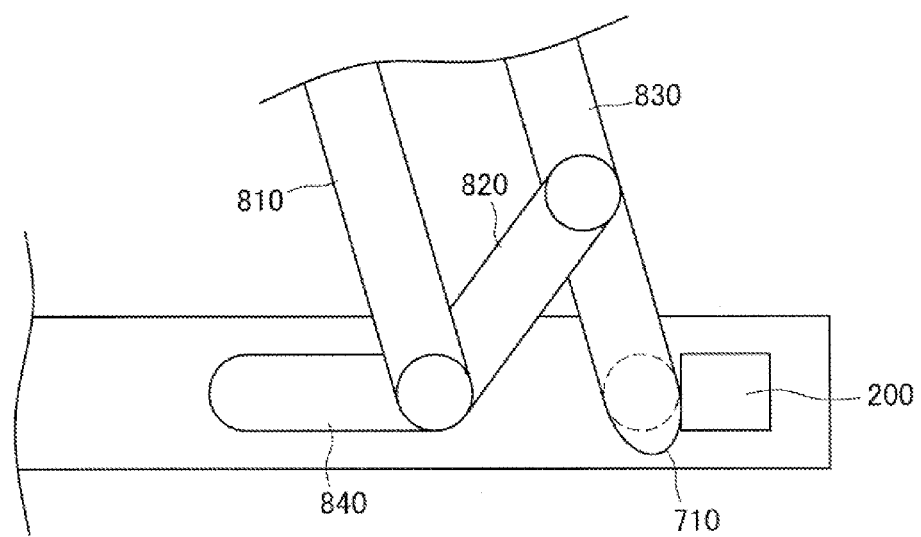
FIG. 13B is a side diagram illustrating enlarged part of the information processing apparatus illustrated in FIG. 13A.

Firstly, a description is given of the information processing apparatus 10C according to the third embodiment of the present disclosure, the information processing apparatus 10C being in use. FIG. 13A is an example of a side diagram of the in-use information processing apparatus 10C according to the third embodiment of the present disclosure. FIG. 13B is a side diagram illustrating enlarged part of the information processing apparatus 10C illustrated in FIG. 13A.

As illustrated in FIG. 13A, when the information processing apparatus 10C is in use, supporting portions 810 slide along groove portions 840 in response to the opening of the lid body 14 by the user. As the result, the lid body 14 is supported by the supporting portions 810, supporting portions 820, and supporting portions 830. The user performs key input on the key input device 12 while viewing key input results displayed on the display device 18 provided on the lid body 14.

The in-use information processing apparatus 10C according to the third embodiment of the present disclosure has heretofore been described.

[3-2. Information Processing Apparatus in Intermediate State]

Figure 14A:
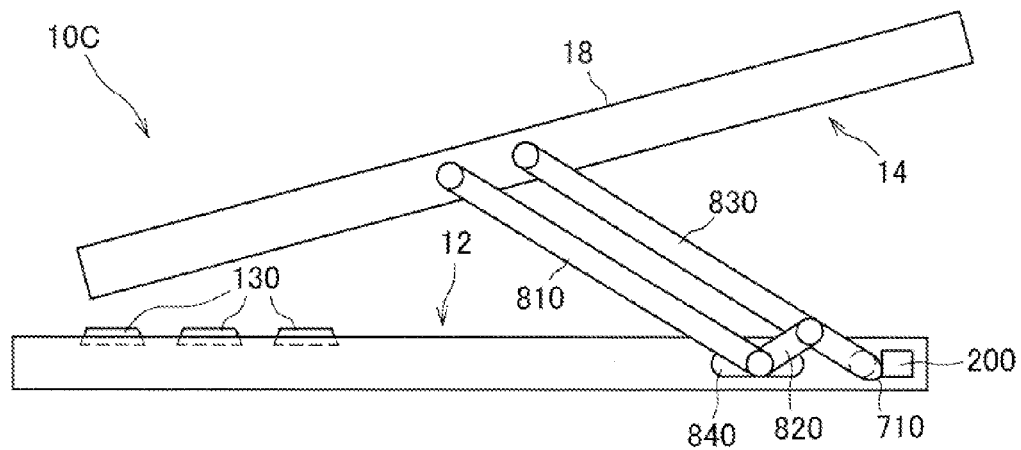
FIG. 14A is an example of a side diagram of the information processing apparatus in an intermediate state according to the third embodiment of the present disclosure.

Subsequently, a description is given of the information processing apparatus 10C according to the third embodiment of the present disclosure, the information processing apparatus 10C being in the intermediate state. FIG. 14A is an example of a side diagram of the intermediate-state information processing apparatus 10C according to the third embodiment of the present disclosure. For example, as illustrated in FIG. 14A, when an angle between the lid body 14 and the bezel 500 becomes smaller than a first angle, the first cam 710 may apply a pressing force to the keytops 130 by using a pressure applied in the rotating direction from the outside for closing the lid body 14.

In particular, in the example in FIG. 14A, when the angle between the lid body 14 and the bezel 500 becomes smaller than the first angle, the first cam 710 applies a horizontal pressing force (in the right direction in FIG. 14A) to a supporting member 200 by using the pressure applied in the rotating direction from the outside for closing the lid body 14. As the result, the keytops 130 slide obliquely downward.

The intermediate-state information processing apparatus 10C according to the third embodiment of the present disclosure has heretofore been described.

[3-3. Information Processing Apparatus Not in Use]

Figure 14B:
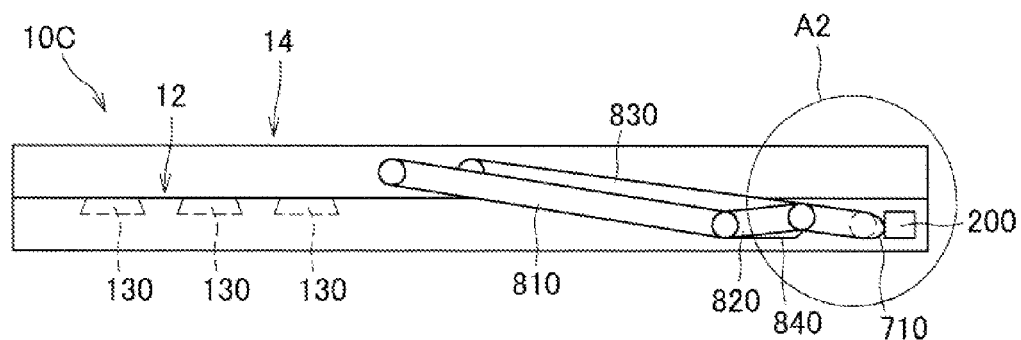
FIG. 14B is an example of a side diagram of the information processing apparatus that is not in use.
Figure 14C:
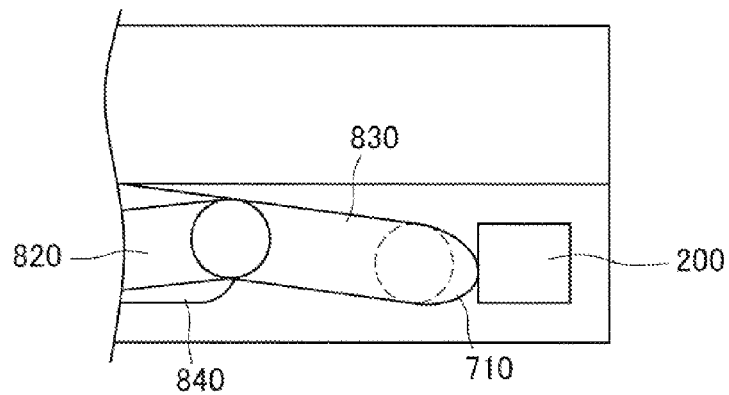
FIG. 14C is a diagram illustrating enlarged part of the information processing apparatus illustrated in FIG. 14B.

Subsequently, a description is given of the information processing apparatus 10C according to the third embodiment of the present disclosure, the information processing apparatus 10C being not in use. FIG. 14B is an example of a side diagram of the not-in-use information processing apparatus 10C. FIG. 14C is a diagram illustrating enlarged part of the information processing apparatus 10C illustrated in FIG. 14B.

As illustrated in FIGS. 14B and 14C, when the information processing apparatus 10C is not in use, the angle between the lid body 14 and the bezel 500 is smaller than the first angle, the first cam 710 applies a horizontal pressing force (in the right direction in FIGS. 14B and 14C) to the supporting member 200 by using the pressure applied in the rotating direction from the outside for closing the lid body 14. As the result, the keytops 130 slide obliquely downward.

On the other hand, in the case where the user opens the lid body 14, where the angle between the lid body 14 and the bezel 500 becomes larger than the first angle, and where the pressing force applied to the supporting member 200 is released, the keytops 130 slide obliquely upward.

The not-in-use information processing apparatus 10C according to the third embodiment of the present disclosure has heretofore been described.

The third embodiment of the present disclosure has heretofore been described.

<<4. Conclusion>>

According to the embodiments of the present disclosure as described above, it is possible to provide the key input device 12 including the supporting member 200, the plurality of keytops 130, and the control member. The supporting member 200 includes the groove portions 140 inclined with respect to the horizontal direction. The plurality of keytops 130 each include the sliding portions 150 which are fitted in the respective groove portions 140 and slide obliquely upward and downward along the groove portions 140. The control member causes the sliding portions 150 provided in each of the at least two keytops 130 among the plurality of keytops 130 to slide obliquely downward along the groove portions 140.

Such a structure makes it possible to reduce the height of the keytops 130 by sliding the sliding portions 150 obliquely downward along the groove portions 140 in a simple structure. Thus, the key input device 12 can be made thinner easily from the sturdiness and cost viewpoints. For example, when the key input device 12 is not in use, the keytops 130 are held at the lower position, and thus it is possible to reduce the height of the keytops 130. In addition, for example, when the key input device 12 is in use, keytops 130 are held at the upper position, and thus it is possible to ensure the feeling of the key touch.

Meanwhile, a general clam-shell PC is sometimes designed to have a gap or the like so that a surface of a liquid crystal display provided on a lid body can be prevented from coming into contact with keytops when the lid body is in a closed state. However, when the lid body is bent due to a pressing force applied in a forced manner, the surface of the liquid crystal display might be damaged due to contact with the keytops. According to the embodiments of the present disclosure, the keytops 130 can be made lower than (or flush with) the surface of the bezel 500. Thus, even if a force is applied to the lid body in the forced manner, the liquid crystal display is less likely to be damaged.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A key input device including:
a supporting member including groove portions inclined with respect to a horizontal direction;
a plurality of keytops each including a sliding portion which is fitted in a corresponding groove portion of the groove portions and slides along the groove portion; and
a control member configured to cause two or more keytops of the plurality of keytops to slide obliquely downward along the groove portions.

(2) The key input device according to (1),
wherein the control member causes the two or more keytops to slide obliquely downward along the groove portions by applying a pressing force to the two or more keytops.

(3) The key input device according to (1) or (2), further including:
a predetermined fixing member configured to cause the two or more keytops to slide obliquely upward.

(4) The key input device according to (2),
wherein the control member causes the two or more keytops to slide obliquely downward along the groove portions by applying a horizontal pressing force to the supporting member and applying a pressing force to the two or more keytops via the supporting member.

(5) The key input device according to (2),
wherein the control member causes the two or more keytops to slide obliquely downward along the groove portions by applying a horizontal pressing force to a bezel and applying a pressing force to the two or more keytops via the bezel.

(6) The key input device according to (1),
wherein the control member causes the two or more keytops to slide obliquely downward along the groove portions by using a pressure applied from outside.

(7) The key input device according to (6),
wherein the control member causes the two or more keytops to slide obliquely downward along the groove portions by using a pressure applied from outside for closing a lid body.

(8) The key input device according to (7),
wherein the control member includes a first cam, and when an angle between the lid body and a bezel becomes smaller than a first angle, the first cam applies a pressing force to the keytops by using a pressure in a rotating direction, the pressure being applied from outside for closing the lid body.

(9) The key input device according to (8),
wherein the control member includes a second cam, and when the angle between the lid body and the bezel becomes smaller than a second angle, the second cam presses down a detection switch for key input cancellation by using the pressure in the rotating direction, the pressure being applied from outside for closing the lid body.

(10) The key input device according to (9),
wherein the second angle is larger than the first angle.

What is claimed is:
1. A key input device comprising:
a supporting member including groove portions inclined with respect to a horizontal direction;
a plurality of keytops each including a sliding portion which is fitted in a corresponding groove portion of the groove portions and slides along the groove portion; and
a control member configured to cause two or more keytops of the plurality of keytops to slide obliquely downward along the groove portions.

2. The key input device according to claim 1,
wherein the control member causes the two or more keytops to slide obliquely downward along the groove portions by applying a pressing force to the two or more keytops.

3. The key input device according to claim 1, further comprising:
a predetermined fixing member configured to cause the two or more keytops to slide obliquely upward.

4. The key input device according to claim 2,
wherein the control member causes the two or more keytops to slide obliquely downward along the groove portions by applying a horizontal pressing force to the supporting member and applying a pressing force to the two or more keytops via the supporting member.

5. The key input device according to claim 2,
wherein the control member causes the two or more keytops to slide obliquely downward along the groove portions by applying a horizontal pressing force to a bezel and applying a pressing force to the two or more keytops via the bezel.

6. The key input device according to claim 1,
wherein the control member causes the two or more keytops to slide obliquely downward along the groove portions by using a pressure applied from outside.

7. The key input device according to claim 6,
wherein the control member causes the two or more keytops to slide obliquely downward along the groove portions by using a pressure applied from outside for closing a lid body.

8. The key input device according to claim 7,
wherein the control member includes a first cam, and when an angle between the lid body and a bezel becomes smaller than a first angle, the first cam applies a pressing force to the keytops by using a pressure in a rotating direction, the pressure being applied from outside for closing the lid body.

9. A key input device comprising:
a supporting member including groove portions inclined with respect to a horizontal direction;
a plurality of keytops each including a sliding portion which is fitted in a corresponding groove portion of the groove portions and slides along the groove portion; and
a control member configured to cause two or more keytops of the plurality of keytops to slide obliquely downward along the groove portions,
wherein the control member causes the two or more keytops to slide obliquely downward along the groove portions by using a pressure applied from outside for closing a lid body,
wherein the control member includes a first cam, and when an angle between the lid body and a bezel becomes smaller than a first angle, the first cam applies a pressing force to the keytops by using a pressure in a rotating direction, the pressure being applied from outside for closing the lid body, and
wherein the control member includes a second cam, and when the angle between the lid body and the bezel becomes smaller than a second angle, the second cam presses down a detection switch for key input cancellation by using the pressure in the rotating direction, the pressure being applied from outside for closing the lid body.

10. The key input device according to claim 9, wherein the second angle is larger than the first angle.

\* \* \* \* \*